C. D. HILLABOLD.
EYEGLASSES.
APPLICATION FILED MAR. 17, 1921.
1,412,114. Patented Apr. 11, 1922.
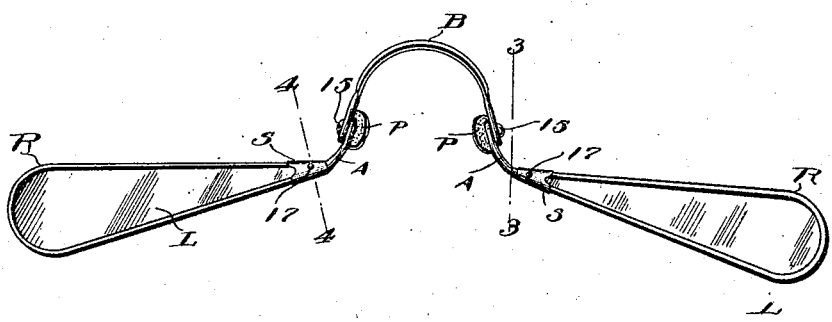
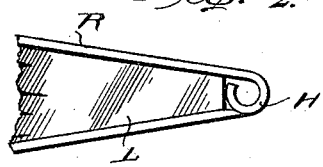
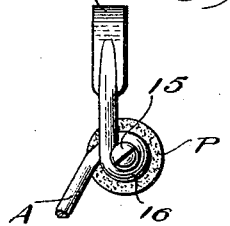
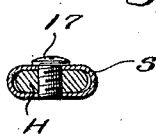
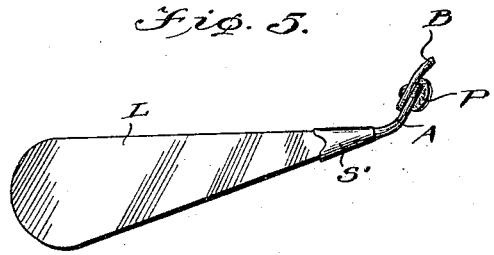
WITNESSES
INVENTOR
C. D. Hillabold,
BY
ATTORNEYS

UNITED STATES PATENT OFFICE.

CHARLES DOUGLASS HILLABOLD, OF PUEBLO, COLORADO.

EYEGLASSES.

1,412,114. Specification of Letters Patent. Patented Apr. 11, 1922.

Application filed March 17, 1921. Serial No. 453,176.

*To all whom it may concern:*

Be it known that I, CHARLES DOUGLASS HILLABOLD, a citizen of the United States, and a resident of Pueblo, in the county of Pueblo and State of Colorado, have invented certain new and useful Improvements in Eyeglasses, of which the following is a specification.

My invention relates to eye glasses and the purpose of my invention is the provision of a pair of glasses particularly designed for near vision and having lenses of such a size and shape that they completely intercept one's vision only when reading so that they cannot be accidentally used for distant vision.

It is also a purpose of my invention to provide eye glasses having the desirable features of simplicity to permit of their being manufactured at a low cost, strength to render them durable, and lightness so that they can be worn on the nose without causing sores, marks or irritations. Furthermore, the glasses are of a size extremely small as compared to eye glasses in present use so that when worn they are practically invisible at a very short distance.

I will describe one form of eye glasses embodying my invention and will then point out the novel features thereof in claims.

In the accompanying drawings:

Figure 1 is a view showing in rear elevation one form of eye glasses embodying my invention.

Figure 2 is an enlarged fragmentary detail view of one of the lenses and supporting frame shown in Figure 1.

Figure 3 is a sectional view taken on the line 3—3 of Figure 1.

Figure 4 is a sectional view taken on the line 4—4 of Figure 1.

Figure 5 is a view showing in side elevation an attaching means embodying my invention for a rimless lens.

Similar reference characters refer to similar parts in each of the several views.

Referring specifically to the drawings and particularly to Figure 1, B designates the bridge of the glasses, from the opposite ends of which are projected the supporting arms A for the lenses L, while at the junction of the arms and bridge, nose pads P are provided which contact with the nose for supporting the glasses as a unit thereon.

The bridge B and arms A are formed from a single length of resilient metal which is arched intermediate its ends to provide the bridge B and bent in the manner shown to provide the arms A. The pads P are formed of any suitable material and are secured in position by means of screws 15 which extend through eyes 16 that are formed by looping the single length of metal upon itself in a manner clearly shown in Figure 3. The free ends of the arms A have secured thereto, preferably by means of welding, metallic sockets S adapted to receive rings H formed on the confronting ends of the lenses L and secured therein by means of screws 17.

Each ring H is formed at the apex of an attenuated pear-shaped rim or frame R which is formed of metal that is curved on its inner side to accommodate and retain therein the lens L, it being particularly noted that the end of the ring remains unattached. The ring H is formed by inturning and looping one end of the frame upon itself and then soldering the other end of the frame to the outer edge of the head. Each lens L is of a corresponding shape as the rim R and in its applied position is securely embraced by the rim, the application of the screw 17 to the socket S tightening the rim around the lens, by reason of forcing the free end of the ring against the end of the lens. In this manner the lenses L are securely held upon the arms A and in proper position with respect to the bridge B so that when the glasses are applied the lenses will be so disposed as to intercept one's vision when reading at short distances. By virtue of the particular contour of the lenses, it will be manifest that they completely intercept one's vision when reading but that they fail to intercept distant vision so that it is unnecessary to remove the glasses when looking at a distance. This is of special advantage because it prevents the use of near vision lenses for distant vision such as often occurs in glasses of the ordinary construction when presbiopic persons first begin to wear glasses for reading. They invariably fail to remove the glasses when viewing distant objects, which naturally is injurious to the eye.

In the applied position of the glasses, the resilient material of which the bridge B is formed exerts sufficient tension upon the pads P so that they clampingly engage the nose and thus securely support the glasses. This extremely simple construction is sufficient for the purpose, it being retained in mind that the glasses are very small as compared to glasses now in use so that a rigid and more substantial supporting means is unnecessary. The smallness and lightness of the supporting frame and lenses permits of their being worn without irritation of the nose, at the same time practically rendering them unbreakable. In practice, the glasses are of such a size that they are practically invisible when in applied position upon the nose which is manifestly an added advantage especially to those who consider the wearing of glasses unsightly.

Referring now to Figure 5, I have here shown a socket S' that may or may not be formed with screw openings. Into this socket, a rimless lens L is adapted to be secured by cement thus eliminating the necessity of employing screws as in the form shown in Figure 1.

Although I have herein shown and described only one form of glasses and two forms of lens attaching and supporting means, it is to be understood that various changes and modifications may be made herein without departing from the spirit of the invention or the spirit and scope of the appended claims.

What I claim is:

1. A pair of eye glasses comprising, a resilient bridge, supporting arms formed on the ends of the bridge, gripping pads sustained on the opposite ends of the bridge, sockets formed on the ends of the arms, lens embracing rims, expansible rings formed on the rims and insertable within said sockets, and means for securing the rings within the sockets and for expanding the rings for the purpose described.

2. A pair of eye glasses comprising, a bridge, and lenses inclined downwardly in opposite directions from the lowermost point of the bridge, said lenses gradually increasing in width from the bridge to the free ends of the lenses.

3. A pair of eye glasses comprising a bridge, and lenses supported on the bridge which are symmetrically graduated in width from one end to the other in such manner that the side edges define straight lines that converge to the meeting point of the narrow end of the lens and below the crest of the bridge whereby, the lenses are adapted to completely intercept the inner vision without intercepting the distant vision.

4. A pair of eye glasses comprising a bridge, supporting arms sustained on the bridge, sockets formed on the free ends of the arms, and lenses of attenuated pear-shape formation having the small ends secured within said sockets.

CHARLES DOUGLASS HILLABOLD.